United States Patent
Harada et al.

(10) Patent No.: US 9,601,749 B2
(45) Date of Patent: Mar. 21, 2017

(54) ELECTRODE FOR BATTERY, NONAQUEOUS ELECTROLYTE BATTERY, AND BATTERY PACK

(75) Inventors: Yasuhiro Harada, Yokohama (JP); Norio Takami, Yokohama (JP); Hiroki Inagaki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/537,890

(22) Filed: Jun. 29, 2012

(65) Prior Publication Data
US 2013/0071724 A1    Mar. 21, 2013

(30) Foreign Application Priority Data
Sep. 16, 2011  (JP) .................................. 2011-203009

(51) Int. Cl.
  *H01M 4/64*    (2006.01)
  *H01M 2/02*    (2006.01)
  (Continued)

(52) U.S. Cl.
  CPC ........... *H01M 4/131* (2013.01); *H01M 4/485* (2013.01); *H01M 2004/021* (2013.01)

(58) Field of Classification Search
  USPC ...................... 429/231.5, 163, 211
  See application file for complete search history.

(56) References Cited

U.S. PATENT DOCUMENTS

| | | | |
|---|---|---|---|
| 2010/0178560 A1* | 7/2010 | Kim | H01B 1/08 429/217 |
| 2010/0248038 A1* | 9/2010 | Takami | H01M 4/364 429/332 |

(Continued)

FOREIGN PATENT DOCUMENTS

| | | |
|---|---|---|
| JP | 8-227708 | 9/1996 |
| JP | 9-27314 | 1/1997 |

(Continued)

OTHER PUBLICATIONS

Wu Yu and Xu Boquing, "Synthesis and characterization of monoclinic TiO2 nanosheets", Chinese Science Bueletin, Vo. 50 No. 19, Oct. 2005, pp. 2153-2156.*

(Continued)

*Primary Examiner* — Ula C Ruddock
*Assistant Examiner* — Osei Amponsah
(74) *Attorney, Agent, or Firm* — Oblon, McClelland, Maier & Neustadt, L.L.P.

(57) ABSTRACT

According to one embodiment, there is provided an electrode for battery. The electrode includes a current collector and an active material layer provided on the current collector. The active material layer includes a first powder of a monoclinic titanium dioxide compound and a second powder a monoclinic titanium dioxide compound. The first powder has a minor-axis average dimension of primary particles in the range from 0.5 μm to 5 μm and a major-axis average dimension of primary particles in the range from 0.5 μm to 20 μm. The second powder has a minor-axis average dimension of primary particles in the range from 0.01 μm to 0.3 μm and a major-axis average dimension of primary particles in the range from 0.5 μm to 1 μm.

19 Claims, 7 Drawing Sheets

(51) Int. Cl.
*H01M 4/131* (2010.01)
*H01M 4/485* (2010.01)
*H01M 4/02* (2006.01)

(56) References Cited

U.S. PATENT DOCUMENTS

| | | | | |
|---|---|---|---|---|
| 2010/0323244 A1* | 12/2010 | Chiang | ............... | H01B 1/122 |
| | | | | 429/220 |
| 2011/0052993 A1* | 3/2011 | Hoshina et al. | ........... | 429/231.5 |
| 2012/0009449 A1 | 1/2012 | Inagaki et al. | | |
| 2012/0115032 A1 | 5/2012 | Harada et al. | | |

FOREIGN PATENT DOCUMENTS

| | | |
|---|---|---|
| JP | 2002-367608 | 12/2002 |
| JP | 2008-10394 | 1/2008 |
| JP | 2008-34368 | 2/2008 |
| JP | 2008-117625 | 5/2008 |
| JP | 2008-251403 | 10/2008 |
| JP | 2008-251523 | 10/2008 |
| JP | 2009-9727 | 1/2009 |
| JP | 2010-176973 | 8/2010 |
| WO | 2010/131364 | 11/2010 |

OTHER PUBLICATIONS

Liu et al., "Mesoporous TiO2-B Microspheres with Superior Rate Performance for Lithium Ion Batteries, Adv. Mater. Jul. 1, 2011, vol. 23, Issue 30, pp. 3450-3454".*
U.S. Appl. No. 13/353,569, filed Jan. 19, 2012, Hiroki Inagaki, et al.
U.S. Appl. No. 13/362,770, filed Jan. 31, 2012, Yasuhiro Harada, et al.
René Marchand, et al., "$TiO_2$ (B) A New Form of Titanium Dioxide and the Potassium Octatitanate $K_2Ti_8O_{17}$", Material Research Bulletin 15, 1980, 5 pages.
Office Action issued Apr. 1, 2014 in Japanese Patent Application No. 2011-203009 (with English translation).
Combined Chinese Office Action and Search Report issued May 27, 2014 in Patent Application No. 201210251234.4 (with English language translation).
Office Action issued Aug. 26, 2015 in Chinese Patent Application No. 201210251234.4 with English translation.

* cited by examiner

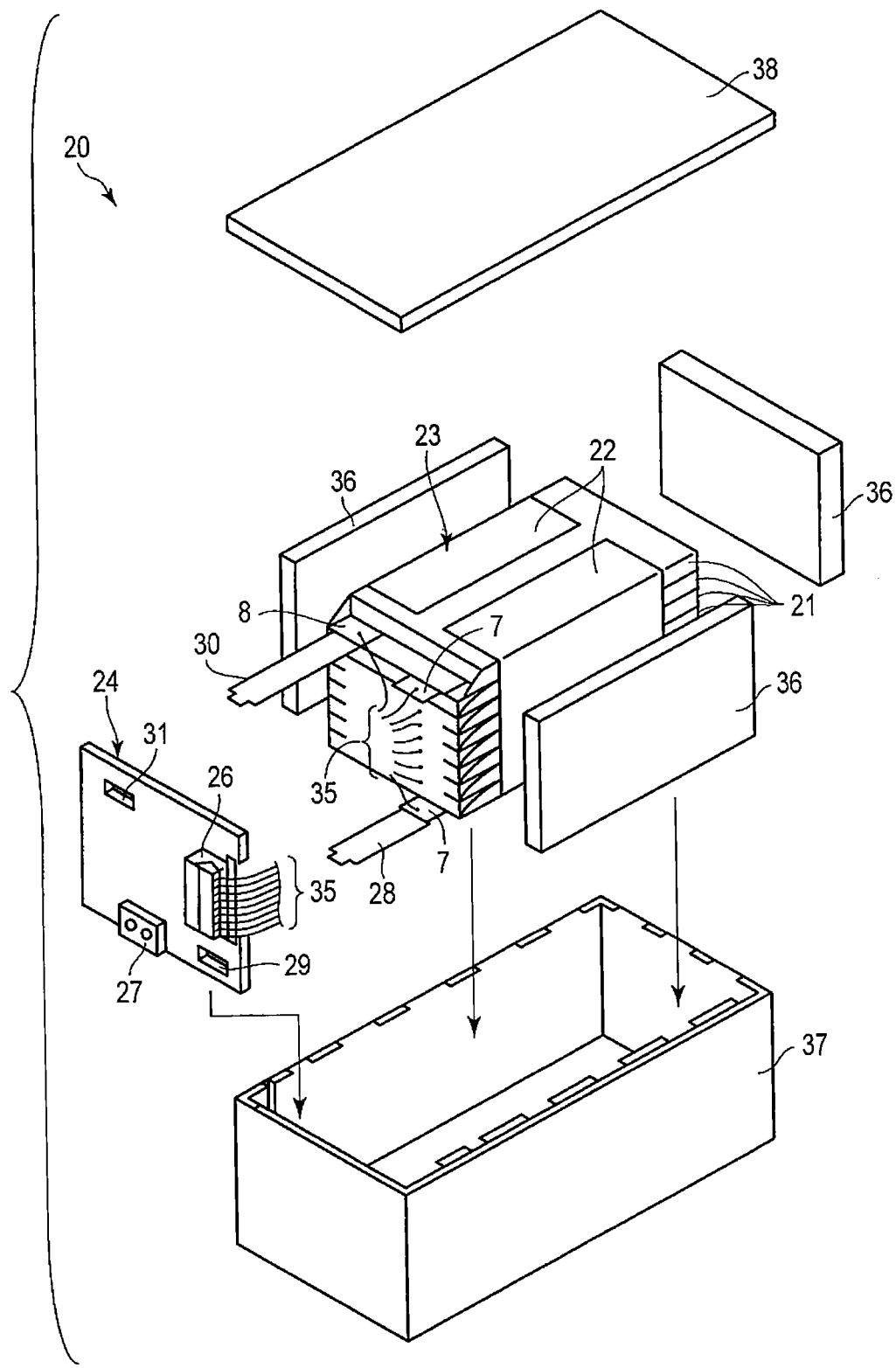
F I G. 8

US 9,601,749 B2

ELECTRODE FOR BATTERY, NONAQUEOUS ELECTROLYTE BATTERY, AND BATTERY PACK

CROSS-REFERENCE TO RELATED APPLICATIONS

This application is based upon and claims the benefit of priority from prior Japanese Patent Application No. 2011-203009, filed Sep. 16, 2011, the entire contents of which are incorporated herein by reference.

FIELD

Embodiments described herein relate generally to an electrode for battery, a nonaqueous electrolyte battery, and a battery pack.

BACKGROUND

Titanium containing oxide has been developed as a negative electrode material for nonaqueous electrolyte battery such as a lithium-ion secondary battery. The battery using the titanium containing oxide can be carried out rapid charging and discharging stably. Further, it has a long life as compared with a battery using a carbon material as a negative electrode material. However, the battery using the titanium containing oxide has a problem such that the energy density is lower.

One of the reasons that the energy density is lower in the battery using the titanium containing oxide is that an electrode comprising titanium containing oxide has a higher potential compared with an electrode comprising a carbon material. For example, the electrode comprising the titanium containing oxide causes insertion/release of lithium ion about 1.5 V (vs Li/Li$^+$). The term "V (vs Li/Li$^+$)" is mean to a potential relative to metallic lithium.

If the negative electrode potential is lowered, the energy density of the battery is improved. However, this is substantially difficult because of the following reasons.

When lithium ion inserts into or releases from the titanium containing oxide, titanium in the oxide is reduced or oxidized. In this case, the titanium is changed from Ti$^{4+}$ to Ti$^{3+}$ or reversely. The potential of the electrode is resulted from the oxidation-reduction reaction of the titanium. Thus, the potential of the electrode is electrochemically restricted. Further, there is a fact that the electrode comprising the titanium containing oxide can be carried out rapid charging and discharging stably because the potential is around 1.5 V (vs Li/Li$^+$). Therefore, it is difficult to decrease the potential of the electrode.

Another reason that the energy density is lower in the battery using the titanium containing oxide is that the capacity per mass of the electrode comprising the titanium containing oxide is lower as compared with that of the electrode comprising a carbon material. For example, the theoretical capacity of a titanium dioxide having anatase structure is about 165 mAh/g. The theoretical capacity of a lithium titanium composite oxide having spinel structure (Li$_4$Ti$_5$O$_{12}$) is about 170 mAh/g. On the other hand, the theoretical capacity of a carbon material such as graphite is 385 mAh/g or more.

One of the reasons that the capacity of the titanium containing oxide is lower is that there are not many sites for lithium ion to insert in a crystal structure. Another reason is that lithium ion is easily stabilized in the crystal structure.

Recently, a monoclinic titanium dioxide has attracted attention. The theoretical capacity of the monoclinic titanium dioxide reaches about 330 mAh/g. However, an effective capacity of the monoclinic titanium dioxide is remarkably lower than the theoretical capacity.

BRIEF DESCRIPTION OF THE DRAWINGS

FIG. 8 is an exploded perspective view of a battery pack according to a third embodiment;

DETAILED DESCRIPTION

Figure 1:
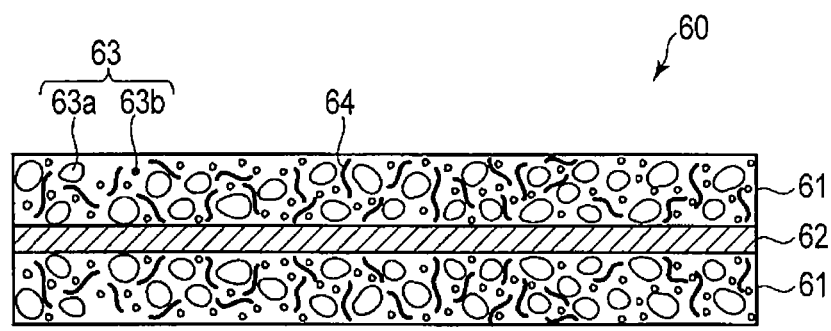
FIG. 1 is a cross-sectional view of an electrode for battery according to a first embodiment.

In general, according to one embodiment, there is provided an electrode for battery. The battery comprises a current collector and an active material layer provided on the current collector. The active material layer comprises a first powder of a monoclinic titanium dioxide compound and a second powder a monoclinic titanium dioxide compound. The first powder has a minor-axis average dimension of primary particles in the range from 0.5 μm to 5 μm and a major-axis average dimension of primary particles in the range from 0.5 μm to 20 μm. The second powder has a minor-axis average dimension of primary particles in the range from 0.01 μm to 0.3 μm and a major-axis average dimension of primary particles in the range from 0.5 μm to 1 μm.

Hereinafter, the embodiments will be described with reference to the drawings. The same reference numerals denote common portions throughout the embodiments and overlapped description is not repeated. Each drawing is a schematic diagram to facilitate the description of the embodiments and its understanding. The shape, size, and ratio thereof are different from those of an actual device. However, they can be appropriately designed and modified by taking into consideration the following description and known techniques.

First Embodiment

FIG. 1 shows a schematic diagram of an electrode for battery according to the first embodiment. FIG. 1 is a cross-sectional view of the electrode.

An electrode 60 comprises an active material layer 61 (also referred to "electrode layer") and a current collector 62. The active material layer 61 is provided on both surfaces of the current collector 62. The active material layer 61 contains an active material 63, a conductive agent 64, and a binder (not shown). The active material layer 61 may be provided on only one surface of the current collector 62. The active material layer 61 may not contain the conductive agent 64 and the binder.

The active material 63 contains a first powder 63a of a monoclinic titanium dioxide compound and a second powder 63b of a monoclinic titanium dioxide compound. The first powder has a minor-axis average dimension of primary particles in the range from 0.5 μm to 5 μm and a major-axis average dimension of primary particles in the range from 0.5 μm to 20 μm.

Hereinafter, the primary particle of the first powder 63a is called "first primary particle". The second powder has a minor-axis average dimension of primary particles in the range from 0.01 μm to 0.3 μm and a major-axis average dimension of primary particles in the range from 0.5 μm to 1 μm. Hereinafter, the primary particle of the second powder 63b is called "second primary particle".

The electrode 60 according to the embodiment is used preferably, as an electrode of a nonaqueous electrolyte secondary battery, more preferably as a negative electrode.

The monoclinic titanium dioxide compound constituting the first powder 63a and the second powder 63b can be represented by the formula of $Li_xTiO_2$. In the formula, x satisfies relationship represented by inequality $0 \leq x \leq 1$. The crystal structure of the monoclinic titanium dioxide represented by the formula of $Li_xTiO_2$ ($0 \leq x \leq 1$) mainly belongs to a space group C2/m. For details, it should be referred to R. Marchand, L. Brohan, M. Tournoux, Material Research Bulletin 15, 1129 (1980).

In the present specification, the crystal structure of the monoclinic titanium dioxide compound represented by the formula $Li_xTiO_2$ ($0 \leq x \leq 1$) is called "crystal structure of $TiO_2$ (B)" whether the compound contains lithium ions or not.

Figure 2:
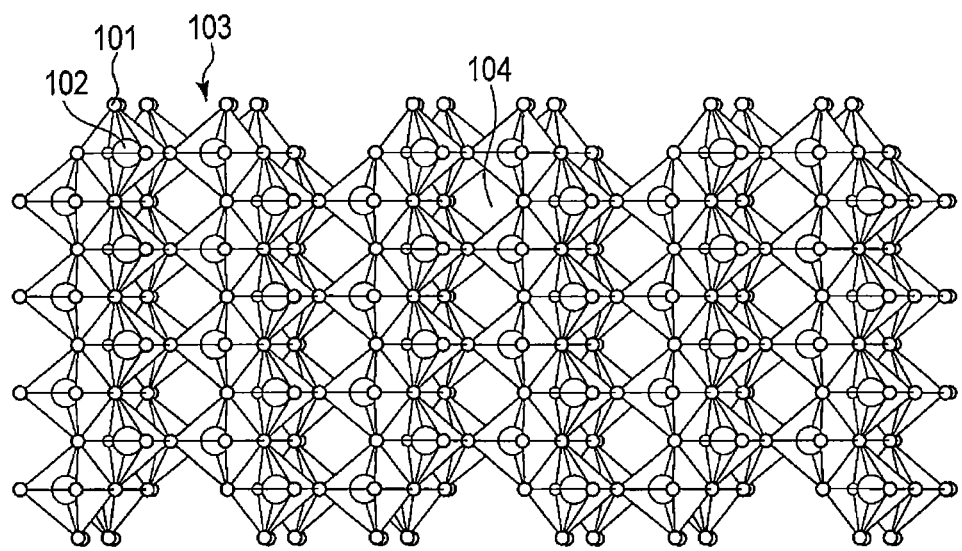
FIG. 2 is a typical view showing the crystal structure of a monoclinic titanium dioxide.

FIG. 2 shows a schematic diagram of the crystal structure of $TiO_2$ (B). The schematic diagram shows a plane (001) of the crystal structure. In the crystal structure, oxygen ions 101 are positioned at the top of an octahedron and a titanium ion 102 is positioned at the center portion of the octahedron. The crystal structure of $TiO_2$ (B) has a layer-like portion constituted of a skeletal structure 103 with successive octahedrons. The layer-like portions are alternately disposed, and thus, tunnel-like gaps 104 are formed. Many of the tunnel-like gaps 104 are observed on the plane (001). Lithium ions may be intercalated (inserted) into the gaps 104. The crystal of the monoclinic titanium dioxide compound may have sites capable of adsorbing and releasing lithium ions in the surface. Thus, lithium ions can be absorbed on the surface of the crystal. Heterologous elements other than lithium ions and/or organic compounds also may be inserted into or absorbed on the crystal.

If lithium ions are intercalated into the gaps 104, titanium constituting the skeleton of the crystal is reduced from $Ti^{4+}$ to $Ti^{3+}$. Thus, the electroneutrality of the crystal is maintained. When the monoclinic titanium dioxide compound is reduced from $Ti^{4+}$ to $Ti^{3+}$, the electron conductivity is improved.

Since the crystal structure of $TiO_2$ (B) has one $Ti^{4+}$ ion per unit lattice represented by $Li_xTiO_2$ (i.e., per Chemical formula), the number of lithium ions to be inserted is theoretically up to 1. Thus, in the formula of $Li_xTiO_2$, the maximum value of x is 1. The value of x may vary in a range of $0 \leq x \leq 1$ due to charge or discharge of the battery.

In this embodiment, the first primary particle has a crystal structure of which the plane (020) is grown. In the plane (020), lithium ions can diffuse rapidly. Thus, particles having the grown plane (020) can provide a high capacity of 240 mAh/g or more. However, when the size of the first primary particle is large, the diffusion distance of lithium ions is great. Because of this, discharging load performance (namely, rate performance) for battery is inferior. Discharging load performance can be improved by increasing the amount of the conductive agent 64 contained in the active material layer 61. However, in the case, the density of the active material layer 61 is decreased, and thus the energy density of the battery may be reduced.

On the other hand, the size of the second primary particle is small, and thus the diffusion distance of lithium ions is small. Therefore, the second primary particle is excellent in discharging load performance. However, the crystallinity of the second primary particle is low. Therefore, a high capacity cannot be provided. Further, a particle having small size has a large specific surface area. Then, such a particle has a high reactivity with the nonaqueous electrolyte. Accordingly, the life performance of the battery using such a particle may be inferior.

The inventors succeed in providing the battery having both of the high capacity and the excellent discharging load performance by using a mixture of the first powder 63a and the second powder 63b as the active material 63 contained in the electrode 60. The active material layer containing only the first powder 63a as the active material 63 has large gaps within the layer. In the case, a large amount of the conductive agent is required to form an electron conduction network. However, when the active material layer contains the first powder 63a together with the second powder 63b as the active material 63, small particles may be disposed in gaps between large particles in the active material layer 61. Thus, the gaps are decreased and the formation of electron conduction network is improved. As a result, discharging load performance can be significantly improved while maintaining the high capacity. Further, the electrode density is improved by decreasing the gaps.

A proportion of a mass of the second powder 63b to the sum of a mass of the first powder 63a and a mass of the second powder 63b is preferably in the range from 25% to 75%. When the proportion of the second powder 63b is 25% by mass or more, the orientation of monoclinic titanium dioxide compound particles in the active material layer can be made weak. Thus, the permeability of the nonaqueous electrolyte in the active material layer can be increased. Therefore, a high charge-and-discharge capacity can be obtained since a first cycle. On the other hand, when the proportion of the second powder 63b is 75% by mass or less, a decrease in the density of the active material layer 61 can be suppressed. The proportion of the mass of the second powder 63b to the sum of the mass of the first powder 63a and the mass of the second powder 63b is more preferably in the range from 25% to 40%.

The density of the active material layer 61 is preferably in the range from 1.8 g/cm³ to 3.0 g/cm³. When the density is less than 1.8 g/cm³, the electrode density is reduced. As a result, the energy density of the battery is reduced. When the density exceeds 3.0 g/cm³, the flexibility of the electrode is reduced and the permeability of the electrolyte solution is significantly reduced.

The term "density" used herein means a value obtained by measuring the thickness and area of the active material layer to calculate the volume and being calculated from the volume and mass. That is, the density above mentioned means a density when both of an open hole communicated with the exterior air and a closed hole that is not communicated with the exterior air are counted in the volume, a so-called bulk density.

The minor and major axes of the first and second primary particles can be determined as follows. When an electrode cross section is observed with an electron microscope, a circle surrounding the particle and contacting with the apexes of the particle (i.e., a circumscribed circle) is drawn. Among a plurality of circles, a circle with the minimum diameter (referred to as a minimum circumscribed circle) is selected. Then, line segments joined two points where the minimum circumscribed circle contacts with the outline of the particle are drawn. Among line segments, line segment having the greatest length is defined as a major axis. Then, perpendicular lines to the major axis are drawn from the each apexes of the particle and obtained line segments joined the apex and the outline of the particle. Among line segments, line segment having the greatest length is defined as a minor axis.

Figure 3:
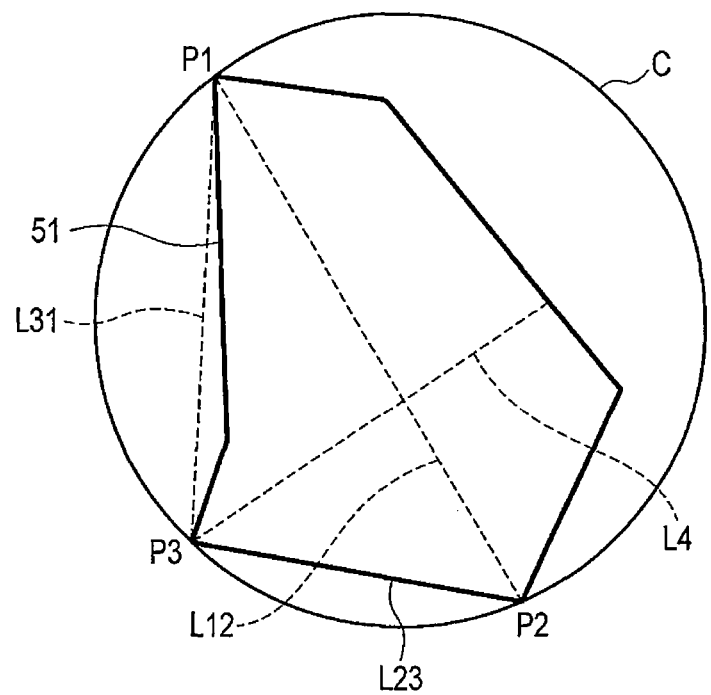
FIG. 3 is a schematic diagram showing a procedure of determining a major axis and a minor axis of a particle.

The procedure will be described more in detail with reference to FIG. 3. A circle C is a minimum circumscribed circle of a squamous particle 51. The circle C is in contact with the outline of the particle 51 at the points P1, P2, and P3. The line segments joining points P1 and P2, points P2 and P3, and points P3 and P1 are designated as L12, L23, and L31, respectively. Among them, line segment L12 is the longest. Therefore, the major axis of particle 51 shown in FIG. 3 is line segment L12.

Among the line segments which are perpendicular to line segment L12 and are joined the apex and the outline of the particle, line segment L4 has the greatest length. Therefore, the minor axis is line segment L4.

<Particle Size Distribution>

As an average dimension each of the minor and major axes of the first and second primary particles, a median diameter (d50) calculated from the particle size distribution (mass base distribution) of the active material 63 is used.

A sample for measuring the particle size distribution can be prepared as follows. First, a target electrode is appropriately cut, immersed into a solvent, and subjected to supersonic wave treatment. As the solvent, organic solvents such as alcohol or N-methylpyrrolidone (NMP) are preferred. Thus, the active material layer 61 is separated from the current collector 62. Further, the active material 63 and the conductive agent 64 can be dispersed in the solvent. The current collector 62 is removed from the dispersion solvent, and the dispersion solvent is subjected to a centrifuge. As a result, the active material 63 can be extracted.

Before the measurement of the particle size distribution (mass base distribution), the form of the particles is observed using an electron microscope or the like in advance. In this case, when the primary particles form the second particles by aggregation or granulation, they are dispersed appropriately. Specifically, by subjecting the second particles to supersonic wave dispersion, the primary particles can be dispersed while preventing breakage of the primary particles. Subsequently, the particle size distribution is measured using a laser diffraction meter and the mass distribution (% by mass) is calculated. Also, the median diameter (d50) is calculated. Here, the term "median diameter" means a value located at the center of the number of data when the data is arranged in order of size. It is also called "median value" or "median diameter". Although the MEDIAN function of Microsoft Excel™ can also be used to calculate these values, they are generally calculated by the software attached to a laser diffraction measurement device. In the embodiment, the calculation was performed using Wing-SALD series software of Shimadzu Corporation.

The particle size distribution of the active material 63 may be determined by measuring the particle size distribution of electrode materials other than the active material 63 (for example, the conductive agent and the binder) in advance and removing the results from the measurement results of the particle size distribution of the electrode.

When the aspect ratio of the primary particle is large, the position of the minor-axis peak is away from the position of the major-axis peak in the particle size distribution. When the aspect ratio of the primary particle is close to 1, there is a case that a part or the entire minor-axis peak overlaps with the major-axis peak in the particle size distribution.

When the both of the aspect ratios of the first and second primary particles are large, the half-width of the peak for minor axis of the first primary particle is preferably equal to or less than 3.0 µm, and the half-width of the peak for the major axis of the second primary particle is preferably equal to or less than 1.0 µm. The median diameter of the peak for the minor axis of the first primary particle is preferably larger by 0.1 µm or more than the median diameter of the peak for the major axis of the second primary particle.

When the both aspect ratios of the first and second primary particles are close to 1, the half-width of the complexed peak of the peaks for the minor and major axis of the first primary particle is preferably equal to or less than 1.0 µm. Also, the half-width of the complexed peak of the peaks for minor and major axis of the second primary particle is preferably equal to of less than 0.5 µm. The median diameter of the complexed peak of the peaks for the minor and the major axis of the first primary particle is preferably larger by 0.1 µm or more than the median diameter of the complexed peak of the peaks for the minor and major axis of the second primary particle.

When the aspect ratio of the first primary particle is large and the aspect ratio of the second primary particle is close to 1, the half-width of the peak for the minor axis of the first primary particle is preferably equal or less than 3.0 µm, and the half-width of the complexed peak of the peaks for the minor and major axis of the second primary particle is preferably equal to or less than 0.5 µm. Also, the median diameter of the peak for the minor axis of the first primary particle is preferably larger by 0.1 µm or more than the median diameter of the complexed peak of the peaks for the minor and major axis of the second primary particle.

When the aspect ratio of the first primary particle is close to 1 and the aspect ratio of the second primary particle is large, the half-width of the complexed peak of the peaks for the minor and major axis of the first primary particle is preferably equal to or less than 1.0 µm, and the half-width of the peak for the major axis of the second primary particle is preferably equal to or less than 1.0 µm. The median diameter of the complexed peak of the peaks for the minor and major axis of the first primary particle is preferably larger by 0.1 µm or more than the median diameter of the peak of the major axis for the second primary particle.

<Aspect Ratio>

If the minor and major axes are determined, the aspect ratio can be determined. The aspect ratio is calculated by the following equation:

Aspect ratio=(dimension of major axis)/(dimension of minor axis)

The aspect ratio in FIG. 3 is calculated by dividing the length of line segment L12 by the length of line segment L4.

The aspect ratio each of the first and second primary particles is not particularly limited and it is preferably within a range from 1 to 10. The aspect ratio may be changed according to the battery performance to be required. For example, when the aspect ratio both of the first and second primary particles is about 1, an electrode having excellent discharging load performance can be obtained. In this case, for example, the average diameter of the first primary particle is about 0.5 µm, and the average diameter of the second primary particle may be from about 0.01 to about 0.3 µm. When the aspect ratio both of the first and second primary particles is 10 or more, an electrode having a high capacity can be obtained. In this case, for example, of the first primary particle may have the minor axis of about 2 µm and the major axis of about 20 µm, the second primary particle may have the minor axis of about 0.1 µm and the major axis of about 1 µm. Such an electrode has many crystal faces advantageous for lithium ion to insert/release so that a high capacity can be provided.

In the case that the powder has a uniform grain size and a high aspect ratio when it is observed by the electron microscope, the powder has a peak corresponding to the minor axis of the particle and a peak corresponding to the major axis of the particle in the particle size distribution measured by a laser diffraction meter. If these peaks can be sufficiently separated, the aspect ratio can be calculated from their median diameters. If these peaks can not be separated, the aspect ratio is regarded as close to 1 and the median diameter can be calculated from these peaks.

The aspect ratio also may be calculated by measuring the minor and major axes of the particle by electron microscope observation and using the resultant values.

The particle in the sample is easy to determine whether it is the first primary particle or the second primary particle because a difference between the particle diameters is sufficiently large. The proportion of the mass of the second powder 63b to the mass of the first powder 63a can be calculated from the mass distribution of the first and second primary particles.

<Specific Surface Area>

The BET specific surface area of the titanium dioxide compound is preferably in the range from 5 m$^2$/g to 100 m$^2$/g. When the specific surface area is 5 m$^2$/g or more, the contact area with the nonaqueous electrolyte can be ensured sufficiently. Thus, the battery performance can be improved. When the specific surface area is 100 m$^2$/g or less, a slurry to be used for production of the electrode can be coated easily. Also, the reactivity of the nonaqueous electrolyte and the active material can be suppressed, thus lifetime performance can be improved.

The specific surface area can be measured by the method comprising the following process:

a molecule of which the adsorption occupying area is known is made to adsorb to the surface of the powder particle at the temperature of liquid nitrogen; and the specific surface area of the powder particle is calculated from the amount of the molecule adsorbed on it.

A method that is most frequently used to obtain the specific surface area is the BET method. The BET method uses the low-temperature and low-humidity physical adsorption of an inert gas and is based on the well-known theory for the calculating specific surface area. The theory is obtained by extending the Langmuir theory which is monolayer adsorption theory to multilayer adsorption. The specific surface area calculated in this manner is referred to as the "BET specific surface area".

<Active Material Layer>

As described above, the active material layer 61 contains the active material 63 and optionally the conductive agent 64 and the binder.

The active material 63 contains the first powder 63a and the second powder 63b described above. The active material 63 may further contains other compounds. When other compounds are comprised in the active material 63, the total amount of the first powder 63a and the second powder 63b is preferably equal to or lager than 50% by mass with respect to the total mass of the active material 63.

When the electrode in this embodiment is used as the negative electrode, examples of other compounds which may be comprised in the active material 63 include titanium dioxide having an anatase structure ($TiO_2$), lithium titanate having a ramsdellite structure ($Li_2Ti_3O_7$), and lithium titanate having a spinel structure ($Li_4Ti_5O_{12}$). These compounds are preferred because they have a specific gravity close to that of the monoclinic titanium dioxide compound and thus, they are easily mixed or dispersed.

The proportion of the mass of the first powder 63a to the mass of the second powder 63b in the active material layer is preferably from 75:25 to 25:75.

The binder is used to fill gaps of the dispersed active material 63. Examples of the binder include polytetrafluoroethylene (PTFE), polyvinylidene fluoride (PVdF), fluorine-based rubber, and styrene butadiene rubber.

The conductive agent 64 is used to improve the current collection performance and suppress the contact resistance with the current collector 62. A fibrous conductive agent is preferably used. Examples thereof include carbon fibers such as a carbon nano fiber or a carbon nanotube; conductive fiber ceramics such as conductive zirconia or indium tin oxide (ITO); and a fibrous conductive polymer. In each case, the fiber diameter is preferably in the range from 50 to 200 nm and the fiber length is preferably in the range from 5 to 100 µm. The diameter and length of the fiber are appropriately determined according to the desired electrode performance or the minor-axis dimension for the active material 63 to be used.

In the active material layer 61, the content of the active material 63, the binder, and the conductive agent 64 is preferably in the range from 70% by mass to 98% by mass, from 2% by mass to 30% by mass, and from 2% by mass to 30% by mass, respectively. When the amount of the binder is 2% by mass or more, the binding property of the active material layer 61 and the current collector 62 is sufficient and excellent cycle performance can be obtained. On the other hand, in order to improve capacity, the content of the binder is preferably 30% by mass or less. When the amount of the conductive agent 64 is 2% by mass or more, the current collection performance of the active material layer can be improved. On the other hand, in order to improve capacity, the content of the conductive agent 64 is preferably 30% by mass or less.

The current collector 62 is made of a material which is electrochemically stable at the potential which insertion and release of the lithium ion occur in the active material 63. Examples of such a material include Cu, Ni, Al, and stainless steel. The thickness of the current collector 62 is preferably from 5 to 20 µm. When the thickness is in the range, the weight of the current collector can be reduced, while maintaining the strength of the electrode.

<Synthesis Method of Monoclinic Titanium Dioxide Compound>

The monoclinic titanium dioxide compound can be synthesized by the following method. First, an alkali titanate compound is reacted with acid to exchange its alkali cation for a proton. Thus, a titanate proton compound (i.e., a proton-exchanged compound) is obtained. Subsequently, the titanate proton compound is subject to a heat-treatment. Thus, a titanium dioxide compound having a crystal structure of monoclinic titanium dioxide is produced.

Examples of the alkali titanate compound used as a raw material include potassium titanate ($K_2Ti_4O_9$), sodium titanate ($Na_2Ti_3O_7$), and cesium titanate ($Cs_2Ti_5O_{12}$). The alkali cation of the alkali titanate compound such as $Na_2Ti_3O_7$, $K_2Ti_4O_9$ or $Cs_2Ti_5O_{12}$ is exchangeable for proton by treating with an acid without deteriorating the crystal structure.

The powder of the alkali titanate compound is washed with distilled water sufficiently to remove impurities. Then, the powder is subjected to a proton exchange. The proton exchange is performed by an acid treatment. The acid treatment includes the step of adding acids such as hydrochloric acid, nitric acid, or sulfuric acid, having a concentration of 0.5 to 2 M to the powder and stirring them. The acid treatment is preferably continued until alkali cations are sufficiently exchanged with protons. When potassium and sodium derived from the raw material are left in the final product, charge and discharge capacity of the electrode may be reduced. Without limitation, the acid treatment is preferably carried out for 24 hours or more when the temperature is about 25° C. (room temperature) and hydrochloric acid having a concentration of about 1 M is used. More preferably, the acid treatment is continued for about 1 to 2 weeks. Further, the acid solution is preferably replaced with a fresh one every 24 hours in order to perform the proton exchange reliably.

After the proton-exchange is completed, an alkaline solution such as an aqueous lithium hydroxide solution is optionally added to neutralize the residual acid. The obtained proton-exchanged compound is washed with distilled water. The washing is sufficiently carried out until the pH of the washing liquid falls within the range of 6 to 8. Then, the washed powder is dried to give the titanate proton compound, which is an intermediate product (precursor).

The titanate proton compound is subjected to heat treatment to give a titanium dioxide compound which is the final objective product.

The optimum temperature of heat treatment differs depending on the composition, particle diameter, and crystal form of the titanate proton compound. Even if any raw material is used, a titanium dioxide compound having a high volume can be synthesized by controlling the heating temperature and the time. The heating temperature is preferably in a range of 300 to 500° C., more preferably in a range of 350 to 400° C. When the heating temperature is in the range of 350 to 400° C., the interlayer distance in the crystal is increased and thus lithium ions are easily moved in the crystal. When the heating temperature is lower than 300° C., the crystallinity is significantly poor, and the capacity of the electrode, charging and discharging efficiency and repetition performance are inferior. On the other hand, when the heating temperature is higher than 500° C., the rearrangement of atoms in the crystal is rapidly facilitated. Thus, the interlayer distance is shrunk and a titanium dioxide having anatase structure is also produced as an impurity phase. As a result, the electrode performance is reduced.

The present inventors have succeeded in synthesizing a crystal of the alkali titanate compound having a desired particle diameter and aspect ratio by using a method which enables a crystal to growth in an anisotropic manner. Examples of such a method include a fusion method, a flux method and a hydrothermal synthesis method.

The fusion method includes steps of melting a raw material at the temperature from 900 to 1500° C. and cooling for crystallization. In the flux method, $K_2MoO_4$ or $K_2WO_4$ is used as a flux. In the hydrothermal synthesis method, an alkaline solution in which KOH as the like is dissolved and $TiO_2$ are used. The hydrothermal synthesis method includes the step of synthesizing a crystal at the temperature from 100 to 500° C. and 10 to 1000 atm. In order to facilitate the crystal growth of a specific plane, the synthesis by the fusion method is more preferred.

The alkali titanate compound particles having a desired particle diameter and aspect ratio synthesized in the above manner are subjected to a proton exchange treatment, and thus, a titanate proton compound ($H_2Ti_4O_9$ etc.) which is a precursor is obtained. The titanate proton compound is heated at a low temperature for a short time to give the monoclinic titanium dioxide compound having a desired particle diameter and aspect ratio.

In the flux method, the primary particle is easily grown. Therefore, when the alkali titanate compound synthesized by the flux method is used as a raw material, the first powder 63a of which primary particles have an average minor-axis dimension of 0.5 to 5 μm and an average major-axis dimension of 0.5 to 20 μm can be obtained.

When the fine particles of the alkali titanate compound synthesized by the solid-phase reaction and the like is used as a raw material, the second powder 63b of which primary particles have an average minor-axis dimension of 0.01 to 0.3 μm and an average major-axis dimension of 0.5 to 1 μm can be obtained.

The reagent of the commercially available alkali titanate compound which is synthesized by the same method as described above may be used as a starting material.

A more preferable method of synthesizing the second powder 63b will be described. First, titanium alkoxide is diluted with a solvent to prepare a titanium alkoxide solution. As titanium alkoxide, for example, titanium tetraisopropoxide can be used. As the solvent, for example, ethanol or 2-propanol can be used.

A mixed solution prepared by mixing ethanol with distilled water (concentration of ethanol: 20 to 50 mass %) are drop to the titanium alkoxide solution. Thus, titanium alkoxide is hydrolyzed and the solution turns into a gel. Then, the gel is heated at the temperature from about 400 to about 600° C. As a result, particles of titanium oxide are obtained.

Then, titanium oxide particles are dispersed in an alkali solution to prepare dispersion. The dispersion is subjected to a hydrothermal synthesis treatment. The hydrothermal synthesis treatment can be performed by a conventionally known procedure. As the alkali solution, for example, a sodium hydroxide solution, a lithium hydroxide solution or a potassium hydroxide solution can be used. The hydrothermal synthesis treatment may be performed under a high pressure of 10 to 1000 atm and a high temperature of 100 to 500° C. using, for example, an autoclave. An alkali titanate compound having at least one structure of a nanotube structure in which a specific crystal plane is grown and a nanowire structure is produced by above treatment. Thus, similarly to the fusion method, a titanium dioxide compound having an orientation on the plane (001) can be synthesized.

<Powder X-ray Diffraction Measurement>

The fact that a titanium dioxide compound has a monoclinic crystal structure can be confirmed by the powder X-ray diffraction (XRD).

The XRD measurement of the active material is carried out in the following manner. First, a target sample is ground until the average particle diameter reaches about 5 μm. The average particle diameter can be found by the laser diffraction method. The ground sample is filled in a holder part which is formed on a glass sample plate and has a depth of 0.2 mm. At this time, much care is necessary to fill the holder part fully with the sample. Further, special care should be taken to avoid cracking and formation of voids caused by insufficient filling of the sample.

Then, a separate glass plate is used to smooth the surface of the sample by sufficiently pressing the separate glass plate against the sample. Much care should be taken to avoid too much or too little amount of the sample to be filled, thereby preventing any rises and dents in the basic plane of the glass holder.

Then, the glass plate filled with the sample is set to a powder X-ray diffractometer. The measurement is carried out by using Cu—Kα rays to obtain a XRD pattern.

When the sample has a high orientation, there is the possibility of a shift of a peak position and variation in intensity ratio, depending on how the sample is filled. In such a case, the measurement is preferably carried out using a rotatable sample table. Specifically, the sample is filled in a glass capillary. The glass capillary is set on a rotating stand and then the measurement is carried out while rotating the stand. The measurement using such a method eliminates a difference in the results of the measurement between operators, enabling high reproducibility.

<Production Method of Electrode>

The electrode can be manufactured, for example, by suspending the active material, and binder and the conductive agent if necessary, in an appropriate solvent to prepare a slurry, by applying this slurry to the surface of the current collector and drying to form a electrode layer, which is then pressed.

Alternatively, the electrode can be manufactured by mixing the active material and binder, and the conductive agent if necessary, forming the mixture into a pellet. The pellet can be used as the electrode layer. The pellet is placed on the current collector.

According to the embodiment described above, the electrode having high discharge capacity since the first cycle and having excellent discharging load performance can be provided.

Second Embodiment

A nonaqueous electrolyte battery according to the second embodiment will be described with reference to the drawings. The nonaqueous electrolyte battery in this embodiment is preferably a nonaqueous electrolyte secondary battery.

The nonaqueous electrolyte battery according to the second embodiment comprises the electrode according to the first embodiment as a negative electrode, a positive electrode, a nonaqueous electrolyte, a separator, and a container.

Figure 4:
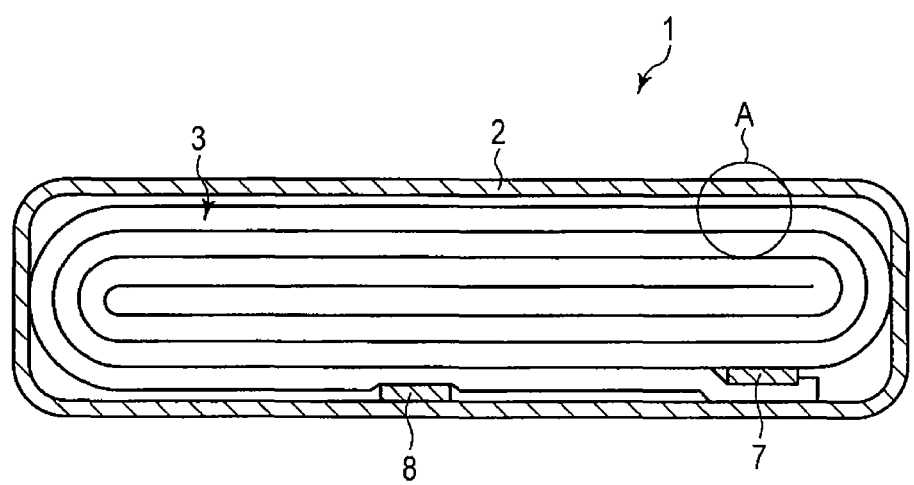
FIG. 4 is a cross-sectional view of a nonaqueous electrolyte secondary battery according to a second embodiment.
Figure 5:
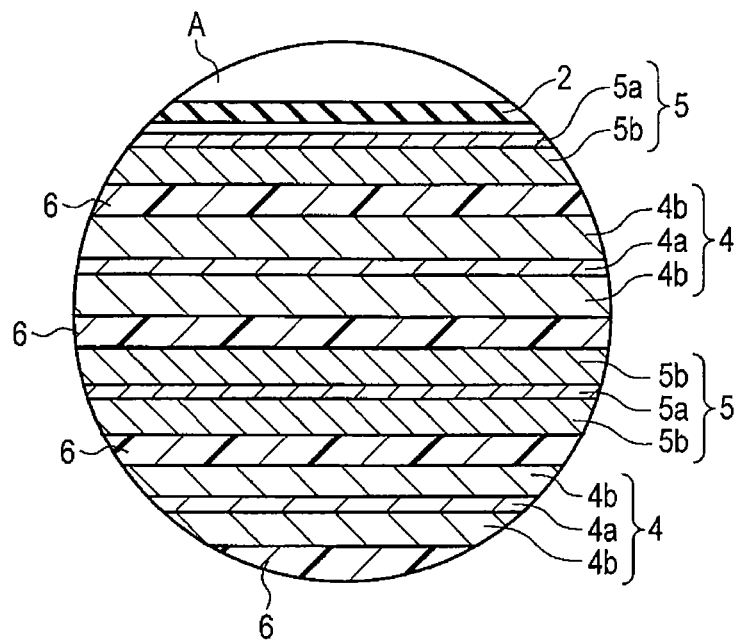
FIG. 5 is an enlarged sectional view of a portion A in FIG. 4.

FIG. 4 is a cross-sectional view of a flat type nonaqueous electrolyte secondary battery. FIG. 5 is an enlarged sectional view of a portion A of FIG. 4. Each drawing is a schematic diagram to facilitate the description of the embodiments and its understanding. The shape, size, and ratio thereof are different from those of an actual device. However, they can be appropriately designed and modified by taking into consideration the following description and known techniques.

A battery 1 comprises a container 2, a wound electrode group 3 with a flat shape, a positive electrode terminal 7, a negative electrode terminal 8, and a nonaqueous electrolyte.

The container 2 has baggy shape. The container 2 is made of a laminate film. The wound electrode group 3 is accommodated in the container 2.

The wound electrode group 3 comprises a positive electrode 4, a negative electrode 5, and a separator 6 as shown in FIG. 5.

The wound electrode group 3 is formed by spirally winding a laminated product obtained by laminating the negative electrode 5, the separator 6, the positive electrode 4, and the separator 6 in this order from the outside and press molding the resultant product.

The laminate is spirally wound so that the negative electrode is located at an outermost periphery. The wound laminate is pressed while heating so that a flat-type electrode group 3 can be produced.

The positive electrode 4 comprises a positive electrode current collector 4a and a positive electrode active material layer (hereinafter, referred to "the positive electrode layer") 4b. The positive electrode layer 4b contains the positive electrode active material and optionally contains the conductive agent and the binder. The positive electrode layer 4b is provided on each surface of the positive electrode current collector 4a.

The negative electrode 5 comprises a negative electrode current collector 5a and a negative electrode active material layer (hereinafter, referred to "the negative electrode layer") 5b. The negative electrode active material layer 5b is provided on both sides of the negative electrode current collector 5a. In the embodiment, the electrode of the first embodiment is used as the negative electrode 5.

As shown in FIG. 4, near the peripheral edge of the wound electrode group 3, the band-shaped positive electrode terminal 7 is connected to the positive electrode current collector 4a. The band-shaped negative electrode terminal 8 is connected to the negative electrode current collector 5a at the outermost layer of the wound electrode group. The positive electrode terminal 7 and the negative electrode terminal 8 are extended to outside through an opening of the container 2. The nonaqueous electrolyte is injected from the opening of the container 2. The wound electrode group 3 and the nonaqueous electrolyte can be completely sealed by heat-sealing the opening of the container 2 across the negative electrode terminal 8 and the positive electrode terminal 7.

The positive electrode terminal 7 is made of, for example, a material having conductivity and electric stability in a potential range of 3 V to 5 V (vs Li/Li$^+$). Specific examples of these materials include aluminum and aluminum alloys containing elements such as Mg, Ti, Zn, Mn, Fe, Cu or Si. The positive electrode terminal 7 is preferably made of the same material as the positive electrode current collector 4a to reduce the contact resistance with the positive electrode current collector 4a.

The negative electrode terminal 8 is made of, for example, a material having conductivity and electric stability in a potential which insertion and release of lithium ion in the negative electrode active material. Specifically, examples of these materials include Cu, Ni, Al, and stainless steel. The negative electrode terminal 8 is preferably made of the same material as the negative electrode current collector 5a to reduce the contact resistance with the negative electrode current collector 5a.

As the positive electrode active material, various oxides and sulfides can be used.

Examples of the oxides and sulfides include lithium ion inserted manganese dioxide ($MnO_2$), iron oxide, copper oxide, nickel oxide, a lithium manganese composite oxide (e.g. $Li_xMn_2O_4$ or $Li_xMnO_2$), a lithium nickel composite oxide (e.g. $Li_xNiO_2$), a lithium cobalt composite oxide (e.g. $Li_xCoO_2$), a lithium nickel cobalt composite oxide (e.g. $LiNi_{1-y}Co_yO_2$), a lithium manganese cobalt composite oxide (e.g. $Li_xMn_yCo_{1-y}O_2$), a lithium-manganese-nickel composite oxide having a spinel structure (e.g. $Li_xMn_{2-y}Ni_yO_4$), a lithium phosphorus oxide having an olivine structure (e.g. $Li_xFePO_4$, $Li_xFe_{1-y}Mn_yPO_4$, $Li_xCoPO_4$), iron sulfate [$Fe_2(SO_4)_3$], a vanadium oxide (e.g. $V_2O_5$), and a lithium nickel cobalt manganese composite oxide. In the formula above, x is more than 0 and 1 or less and y is more than 0 and 1 or less. As the active material, these compounds may be used alone or in combination with other compounds.

A more preferred active material is a compound providing a high positive electrode voltage. Examples thereof include a lithium manganese composite oxide (e.g. $Li_xMn_2O_4$), a lithium nickel composite oxide (e.g. $Li_xNiO_2$), a lithium cobalt composite oxide (e.g. $Li_xCoO_2$), a lithium nickel cobalt composite oxide (e.g. $LiNi_{1-y}Co_yO_2$), a lithium manganese nickel composite oxide having a spinel structure (e.g. $Li_xMn_{2-y}Ni_yO_4$), a lithium manganese cobalt composite oxide (e.g. $Li_xMn_yCo_{1-y}O_2$), lithium iron phosphate (e.g. $Li_xFePO_4$), and a lithium nickel cobalt manganese composite oxide. In the formula above, x is more than 0 and 1 or less and y is more than 0 and 1 or less.

Examples of a preferred active material when the ordinary temperature molten salt is used as the nonaqueous electrolyte of the battery include lithium iron phosphate, for example, $Li_xVPO_4F$ ($0 \leq x \leq 1$), a lithium manganese composite oxide, a lithium nickel composite oxide, and a lithium nickel cobalt composite oxide. Since these compounds have low reactivity with an ordinary temperature molten salt, the cycle life can be improved.

The primary particle diameter of the positive electrode active material is preferably 100 nm or more and 1 μm or less. If it is 100 nm or more, the handling in the industrial production is easy. If it is 1 μm or less, diffusion in solid of lithium ions can be smoothly preceded.

The specific surface area of the positive electrode active material is preferably 0.1 $m^2$/g or more and 10 $m^2$/g or less. If it is 0.1 $m^2$/g or more, the insertion site of lithium ions can be sufficiently ensured. If it is 10 $m^2$/g or less, the handling in the industrial production is made easy and good charge and discharge cycle performance can be ensured.

The binder is used to bind the active material to the current collector. Examples of the binder include polytetrafluoroethylene (PTFE), polyvinylidene fluoride (PVdF), and fluorine-based rubber.

The conductive agent is used, if necessary, to improve the current collection performance and suppress the contact resistance with the current collector. Examples of the conductive agent include carbonaceous substances such as acetylene black, carbon black, and graphite.

The compounding proportion of the positive electrode active material and binder is preferably from 80% by mass to 98% by mass, from 2% by mass to 20% by mass, respectively.

When the content of the binder is 2% by mass or more, sufficient electrode strength is obtained. Further, when the content of the binder is 20% by mass or less, the blending amount of the insulator of the electrode can be decreased and the internal resistance can be reduced.

When the conductive agent is added, the compounding ratio of the positive electrode active material, binder, and conductive agent is preferably from 77% by mass to 95% by mass, from 2% by mass to 20% by mass, and from 3% by mass to 15% by mass, respectively. When the content of the conductive agent is 3% by mass or more, the above effect can be exerted. Further, when the content is 15% by mass or less, decomposition of the nonaqueous electrolyte on the surface of the positive electrode conductive agent under high temperature storage can be reduced.

The positive electrode current collector is preferably made of an aluminum foil or an aluminum alloy foil containing at least one element selected from Mg, Ti, Zn, Ni, Cr, Mn, Fe, Cu, and Si.

The thickness of the aluminum foil and the aluminum alloy foil is preferably 5 μm or more and 20 μm or less, more preferably 15 μm or less. The purity of the aluminum foil is preferably 99% by mass or more. The content of transition metals such as Fe, Cu, Ni, or Cr contained in the aluminum alloy foil is preferably 1% by mass or less.

The positive electrode can be produced by, for example, the following method. First, a positive electrode active material, a conductive agent, and a binder are suspended in a solvent to prepare slurry. The slurry is applied to one or both surfaces of a positive electrode current collector, followed by drying to form a positive electrode layer. Thereafter, the resultant layer is pressed. Alternatively, a pellet is formed from the positive electrode active material, the conductive agent, and the binder. The pellet is used as the positive electrode layer.

As the nonaqueous electrolyte, a liquid nonaqueous electrolyte or gel-like nonaqueous electrolyte can be used. The liquid nonaqueous electrolyte can be prepared by dissolving an electrolyte in an organic solvent. The gel-like nonaqueous electrolyte can be prepared by forming a composite of a liquid electrolyte and a polymer material.

The concentration of the electrolyte in the liquid nonaqueous electrolyte is preferably from 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$]. These electrolytes can be used singly or in combinations of two or more. The electrolyte is preferably one which is not easily oxidized even at a high potential and $LiPF_6$ is the most preferable.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoethane (DEE); and γ-butyrolactone (GBL), acetonitrile (AN), and sulfolane (SL).

These organic solvents can be used singly or in combinations of two or more.

Examples of the polymer material include polyvinylidene fluoride (PVdF), polyacrylonitrile (PAN), and polyethylene oxide (PEO).

Alternatively, an ordinary temperature molten salt (ionic melt) containing lithium ions, polymer solid electrolyte, inorganic solid electrolyte and the like may be used as the nonaqueous electrolyte.

The ordinary temperature molten salt means compounds which can exist in a liquid state at normal temperature (15 to 25° C.) among organic salts constituted of combinations of organic cations and anions. Examples of the ordinary temperature molten salt include those which solely exist in a liquid state, those which are put into a liquid state when mixed with an electrolyte, and those which are put into a liquid state when dissolved in an organic solvent. The melting point of the ordinary temperature molten salt to be used for the nonaqueous electrolyte battery is usually 25° C. or less. Further, the organic cation has generally a quaternary ammonium skeleton.

The polymer solid electrolyte is prepared by dissolving an electrolyte in a polymer material and by solidifying the mixture.

The inorganic solid electrolyte is a solid material having lithium ion-conductivity.

As the separator, a porous film made from materials such as polyethylene, polypropylene, cellulose, or polyvinylidene fluoride (PVdF), a synthetic resin nonwoven fabric or the like can be used. A porous film made of polyethylene or polypropylene melts at a certain temperature and can block electric current, and thus it is preferred from the viewpoint of improvement in safety.

As the container, a baggy container formed of a laminate film or a metal container is used.

Examples of the shape of the container include a flat type (thin type), angular type, cylinder type, coin type and button type sheet-type, lamination-type shapes. The container having a size corresponding to the dimensions of a battery are used. For example, containers for small-sized batteries to be mounted on portable electronic devices and containers for large-sized batteries to be mounted on, for example, two- to four-wheel vehicles are also used.

As the laminate film, a multilayer film prepared by interposing a metal layer between resin layers may be used. The metal layer is preferably formed of an aluminum foil or aluminum alloy foil to reduce the weight of the battery. For example, polymer materials such as polypropylene (PP), polyethylene (PE), nylon or polyethylene terephthalate (PET) may be used for the resin layer. The laminate film can be molded into a desired shape by sealing through thermal fusion. The thickness of the laminate film is preferably 0.5 mm or less, more preferably 0.2 mm or less.

The metal container may be made of aluminum, an aluminum alloy or the like. The aluminum alloy is preferably an alloy containing one or more elements selected from Mg, Zn, and Si. When the alloy contains transition metals such as Fe, Cu, Ni or Cr, the amount of the transition metals is preferably 1% by mass or less. Thus, the long-term reliability under the high temperature and heat releasing property can be dramatically improved. The metal container preferably has a thickness of 1 mm or less, more preferably 0.5 mm or less, still more preferably 0.2 mm or less.

Figure 6:
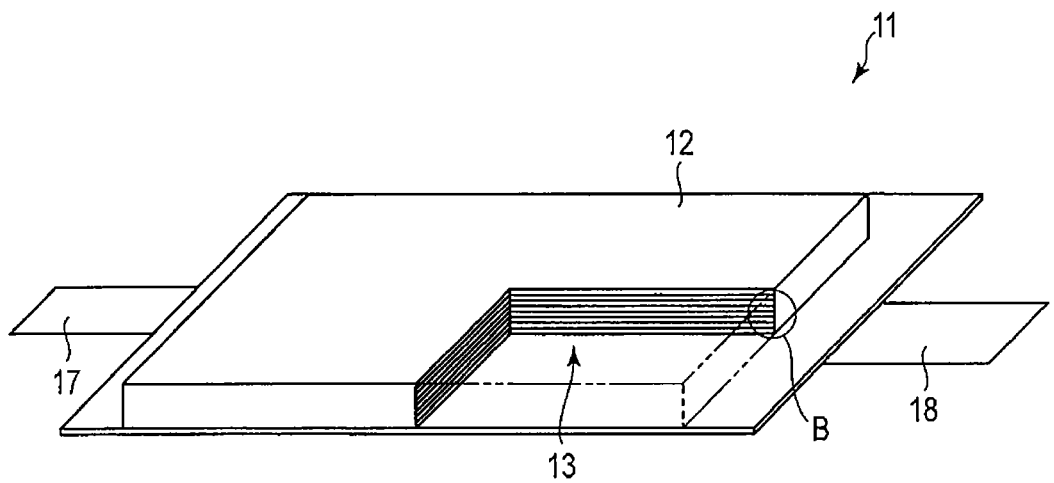
FIG. 6 is a partially broken perspective view of another nonaqueous electrolyte secondary battery according to the second embodiment.
Figure 7:
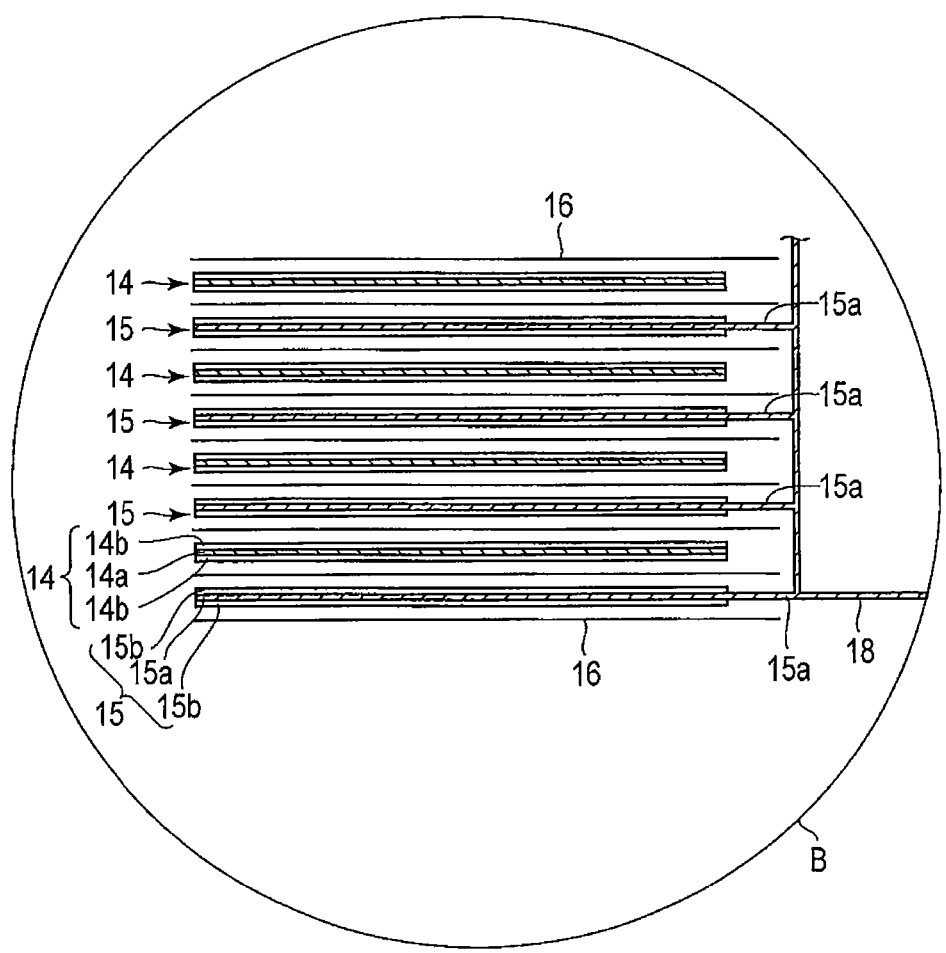
FIG. 7 is an enlarged sectional view of a portion B in FIG. 6.

FIGS. 6 and 7 show the different type of nonaqueous electrolyte secondary battery according to the second embodiment. FIG. 6 is a partially cut perspective view of a flat-type nonaqueous electrolyte secondary battery 11. FIG. 7 is an enlarged view of a portion B of FIG. 6.

A battery 11 comprises a container 12, a lamination-type electrode group 13 accommodated in the container 12 a positive electrode terminal 17, and a negative electrode terminal 18, and a nonaqueous electrolyte.

The container 12 is formed of a laminate film in which a metal layer is interposed between two resin films. As for the lamination-type electrode group 13, as shown in FIG. 7, a laminate is formed by inserting a separator 16 between the positive electrode 14 and the negative electrode 15 and alternately laminating them.

A plurality of the positive electrodes 14 are present and they comprise a positive electrode current collector 14a and a positive electrode layer 14b provided on each surface of the positive electrode current collector 14a. A plurality of the negative electrodes 15 are present and they comprise the negative electrode current collector 15a and a negative electrode layer 15b provided on each surface of the negative electrode current collector 15a.

One side of the each negative electrode current collectors 15a is protruded from the laminate and connected to the band-shaped negative electrode terminal 18. Similarly, not illustrated, one side of the each positive electrode current collectors 14a is protruded from the laminate at the opposite side which the negative electrode current collector 15a is protruded from the laminate. The positive electrode current collectors 14a are connected to the band-shaped positive electrode terminal 17.

The end of the negative electrode terminal 18 is externally drawn out of the container 12. The end of the positive electrode terminal 17 is positioned opposite to the negative electrode terminal 18 and externally drawn out the container 12.

Further, the nonaqueous electrolyte is injected into the container 12.

According to the embodiment described above, the nonaqueous electrolyte battery having high discharge capacity since the first cycle and having excellent discharging load performance can be provided.

Third Embodiment

Subsequently, a battery pack according to a third embodiment will be explained with reference to the drawings. The battery pack comprises one or two or more of the above nonaqueous electrolyte batteries (unit cells) according to the second embodiment. When the battery pack includes two or more unit cells, these unit cells are disposed in such a manner that they are electrically connected in series or in parallel.

Figure 9:
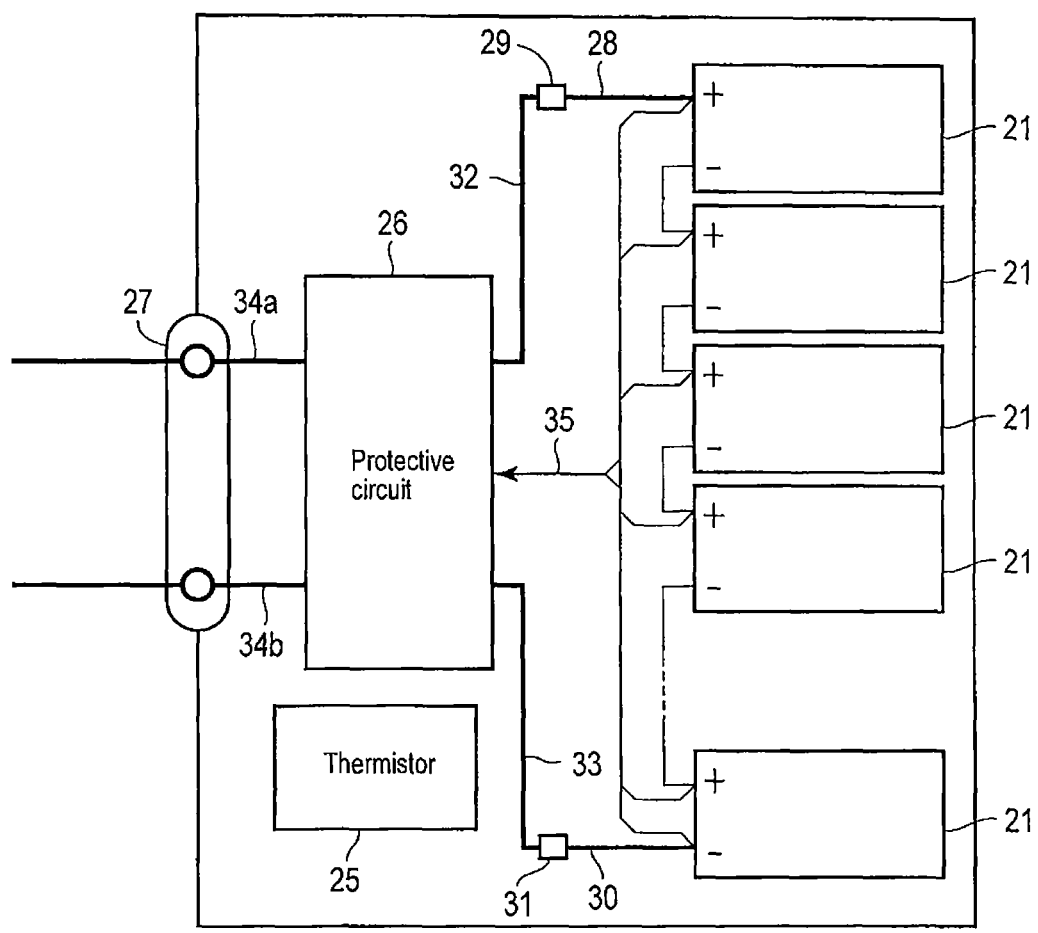
FIG. 9 is a block diagram showing an electric circuit of the battery pack of FIG. 8.

FIG. 8 and FIG. 9 show an example of a battery pack 20. This battery pack 20 comprises one or more flat-type unit cells 21 having the structure shown in FIG. 4. FIG. 8 is an exploded perspective view of the battery pack 20. FIG. 9 is a block pattern showing the electric circuit of the battery pack 20 shown in FIG. 8.

A plurality of unit cells 21 are laminated such that the externally extended positive electrode terminal 7 and negative electrode terminal 8 are arranged in the same direction and fastened with an adhesive tape 22 to thereby constitute a battery module 23. These unit cells 21 are electrically connected in series as shown in FIG. 9.

A printed wiring board 24 is disposed opposite to the side surface of the unit cell 21 from which the positive electrode terminal 7 and negative electrode terminal 8 are extended. As shown in FIG. 9, a thermistor 25, a protective circuit 26 and an energizing terminal 27 connected to external devices are mounted on the printed wiring board 24. An insulating plate (not shown) is attached to the surface of the printed wiring board 24 facing the battery module 23 to avoid unnecessary connection with the wiring of the battery module 23.

A positive electrode side lead 28 is connected to the positive electrode terminal 7 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 8 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detect the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge and over-current of the unit cell 21. The detections of this overcharge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 8 and FIG. 9, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the positive electrode terminal 7 and negative electrode terminal 8 are projected.

The battery module 23 is accommodated in a container 37 together with each protective sheet 36 and printed wiring board 24. Specifically, the protective sheet 36 is disposed on each inside surface in the direction of the long side and on one of the inside surfaces in the direction of the short side of the container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the container 37.

Here, a thermally contracting tape may be used in place of the adhesive tape 22 to secure the battery module 23. In this case, after the protective sheet is disposed on both sides of the battery module and the thermally contracting tubes are wound around the battery module; the thermally contracting tape is contracted by heating to fasten the battery module.

The structure in which the unit cells 21 are connected in series is shown in FIG. 8 and FIG. 9. However, these unit cells may be connected in parallel to increase the capacity of the battery. The assembled battery packs may be further connected in series or in parallel.

Also, the structure of the battery pack is appropriately changed according to its use. The battery pack is preferably used in applications exhibiting excellent cycle performances when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

According to the embodiment described above, the battery pack having high discharge capacity since the first cycle and having excellent discharging load performance can be provided.

EXAMPLES

Hereinafter, the embodiment will be described in detail based on the examples, however, the embodiment is not limited thereto.

<Production of First Powder of Monoclinic Titanium Dioxide Compound>

A first powder of the monoclinic titanium dioxide compound having a minor-axis average dimension of primary particles in the range from 0.5 to 5 μm and a major-axis average dimension of primary particles in the range from 0.5 to 20 μm was produced. First, potassium titanate represented by the formula of $K_2Ti_4O_9$ was synthesized.

As raw materials, potassium carbonate and titanium dioxide were used. These materials were mixed at a molar ratio $K_2CO_3:TiO_2=1:4$ so that $K_2Ti_4O_7$ is synthesized. The molar ratio K:Ti in the $K_2Ti_4O_7$ is 1:2. The mixture was placed in a platinum crucible and melted by heating up to 1000° C.

In order to promoting anisotropic crystal growth, a difference in the rate of crystal growth was utilized. The melted mixture was taken out of the furnace and poured into a cooling plate, thereby rapidly cooling. The obtained solid matter was washed with water to remove a part of potassium ions. Simultaneously, the aggregate was solved. The $K_2Ti_4O_9$ powder thus obtained was a plate-like crystal. The average dimension in a major-axis direction was from 20 to 100 μm and the average dimension in a minor-axis direction was from 1 to 10 μm.

The obtained powder was added to a hydrochloric acid solution having a concentration of 1 M and stirred at 25° C. for two weeks. 1M hydrochloric acid was replaced with a fresh one every 24 hours. Thus, an intermediate product (precursor) represented by the formula of $H_2Ti_4O_9$ was obtained. The intermediate product was sintered at 370° C. for 1 hour. The heated sample was dried in vacuum at 80° C. for 12 hours to obtain titanium dioxide.

The titanium dioxide thus synthesized was observed by the powder X-ray diffraction measurement. As a result, it was identified that the titanium dioxide was titanium dioxide having a $TiO_2(B)$ structure belonging to the space group C2/m.

<Production of Second Powder of Monoclinic Titanium Dioxide Compound>

A second powder of the monoclinic titanium dioxide compound having a minor-axis average dimension of the primary particle in the range from 0.01 to 0.3 μm and a major-axis average dimension of the primary particle in the range from 0.5 to 1 μm was produced.

A titanate proton compound represented by the formula of $H_2Ti_4O_9$ was synthesized using a commercially available $K_2Ti_4O_9$ reagent as a starting material. First, in order to remove impurities, the $K_2Ti_4O_9$ powder was washed with distilled water. Then, 5 g of $K_2Ti_4O_9$ powder was placed in a zirconia pot having an inner volume of 100 $cm^3$. Zirconia balls having diameter of 10 mm were added until the volume became one-third that of the pot. The Zirconia balls were rotated at 800 rpm for 2 hours thereby grinding $K_2Ti_4O_9$ until the average particle diameter was about 1 μm or less.

The ground $K_2Ti_4O_9$ powder was added to a hydrochloric acid solution having a concentration of 1 M and the mixture was stirred at 25° C. for 72 hours. In this case, 1M hydrochloric acid was replaced with a fresh one every 24 hours. As a result, potassium ions were exchanged for protons and the titanate proton compound represented by the formula of $H_2Ti_4O_9$ was obtained. The obtained suspension had good dispersibility, and thus it was difficult to separate it by filtration. Thus, the titanate proton compound was separated from the solvent using a centrifuge. The obtained titanate proton compound was sintered at 400° C. for 1 hour. The heated sample was dried in vacuum at 80° C. for 12 hours to obtain titanium dioxide having a $TiO_2$ (B) structure.

The titanium dioxide thus synthesized was observed by the powder X-ray diffraction measurement. As a result, it was identified that the titanium dioxide was titanium dioxide having a $TiO_2$ (B) structure belonging to the space group C2/m.

<Preparation of Sample>

The first and second powders synthesized in the above manner were mixed to prepare samples. The proportions of the second powder to the total mass of the first and second powders were 0% by mass, 25% by mass, 50% by mass, 75% by mass, and 100% by mass, respectively.

<Measurement of Particle Size Distribution>

The particle size distribution of the samples was measured using a laser diffraction-type size distribution measuring device SALD-200V, manufactured by Shimadzu Corporation. The samples containing the second powder at proportions of 25% by mass, 50% by mass, or 75% by mass were subjected to the measurement. The mass percent was calculated from the measurement results of the mass base distribution. Then, the results equivalent to a loaded mixture ratio were obtained. The median diameter (d50) of the samples (i.e., obtained mixture) was calculated using the WingSALD series software of Shimadzu Corporation. As a result, the diameter of the first powder was 13.5 µm and the diameter of the second powder was 0.5 µm. The aspect ratio each of the first and second powder was about 1, respectively.

<Production of Electrochemical Measuring Cell>

The samples prepared in the above manner, polytetrafluoroethylene as the binder, and acetylene black as the conductive agent were mixed at mass ratios of 80 wt %, 10 wt %, and 10 wt %, respectively. The mixture was molded to produce a test electrode.

Metallic lithium foil was used as a counter electrode. As the nonaqueous electrolyte, an electrolyte solution prepared by dissolving lithium perchlorate in a mixed solvent was used. The concentration of lithium perchlorate was 1 M. The mixed solvent was prepared by mixing ethylene carbonate and diethyl carbonate mixed at a volume ratio 1:1.

A measuring cell was produced by using the test electrode, the counter electrode, and the electrolyte solution. In the case, the metallic lithium is used as the counter electrode and thus the potential of the test electrode is higher than that of the counter electrode. Therefore, the directions of charge and discharge are reverse to those in the case of using the test electrode as the negative electrode. In order to avoid any confusion, it is defined that the direction in which lithium ions are inserted into the test electrode is referred to as a charge direction and a direction where lithium ions are released from the test electrode is referred to as a discharge direction. The test electrode can be operated as the negative electrode by combining with a counter electrode formed by using a conventionally known positive electrode material.

<Electrochemical Measurement>

The charge and discharge test was performed using the measuring cell. The charge and discharge test was performed in the potential range from 1.0 to 3.0 V (vs $Li/Li^+$), a charge and discharge current of 0.2 C, at room temperature. The charge and discharge capacity (mAh/g) per mass of sample (active material) was calculated from the results.

Then, the rapid discharge test was performed using the measuring cell in order to examine discharging load performance (rate performance) of the test electrode. The test was performed in the potential range from 1.0 to 3.0 V (vs $Li/Li^+$) and a charge and discharge current of 5.0 C. The discharge capacity maintenance ratio relative to the 0.2 C discharge capacity was calculated from the obtained discharge capacity.

<Results>

Figure 10:
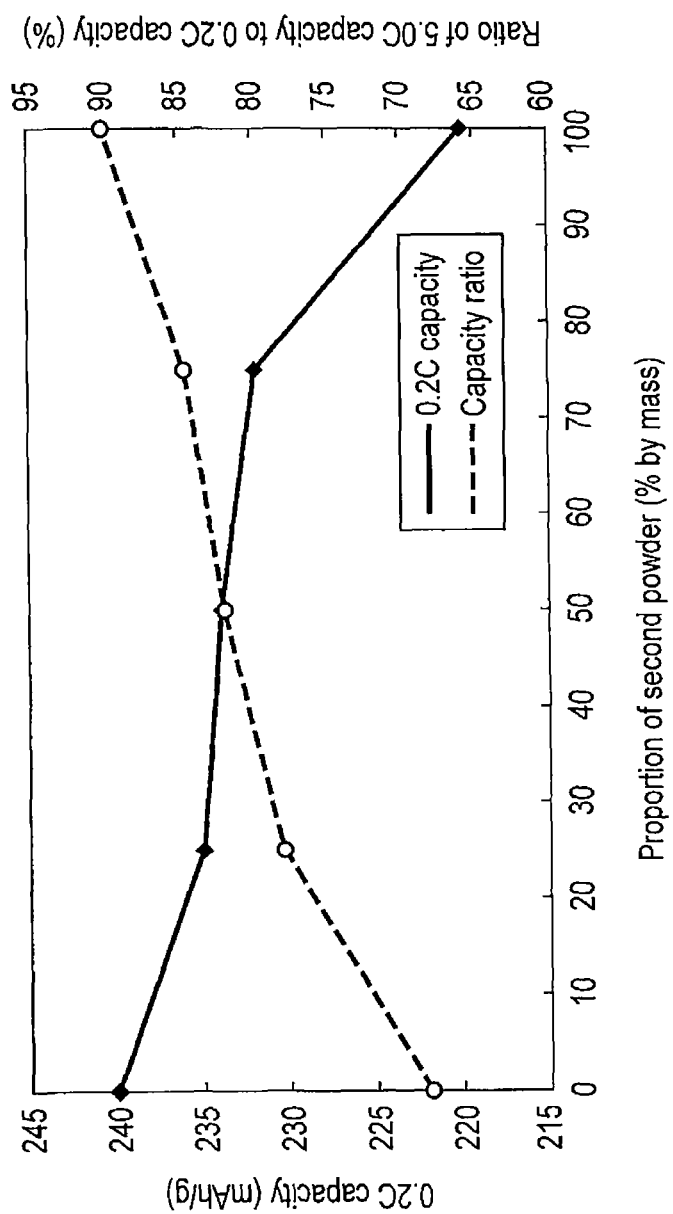
FIG. 10 is a graph showing the results of the electrochemical measurement in Examples.

FIG. 10 showed the relationship between the proportion of the second powder in the sample and the discharge capacity (mAh/g) per sample mass. FIG. 10 also showed the relationship between the proportion of the second powder in the sample and the maintenance ratio of the discharge capacity at 5.0 C relative to the discharge capacity at 0.2 C. The result showed that when the proportion of the second powder was in a range of 25 to 75% by mass, discharge capacity at 0.2 C and discharge capacity maintenance ratio at 5.0 C were superior.

As the proportion of the second powder is increased, the discharge capacity at 0.2 C decreased. However, when the proportion of the second powder was in a range of 25 to 75% by mass, a decrease in the discharge capacity was suppressed.

As the proportion of the second powder is decreased, the discharge capacity maintenance ratio at 5.0 C decreased. However, when the proportion of the second powder was in a range of 25 to 75% by mass, a decrease in the discharge capacity maintenance ratio at 5.0 C was suppressed.

From the results described above, it was showed that discharge capacity at 0.2 C and discharge capacity maintenance ratio at 5.0 C were superior, which is unexpected synergistic effects, by using the mixture of the first and second powders. Therefore, it was showed that according to the embodiments, an electrode, a nonaqueous electrolyte battery, and a battery pack having high charge and discharge capacity and excellent discharging load performance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode for a battery, comprising:
a current collector; and
an active material layer provided on the current collector, the active material layer comprising a first powder of a monoclinic titanium dioxide compound and a second powder of a monoclinic titanium dioxide compound, the first powder comprising first primary particles having a minor-axis average dimension in the range from 0.5 µm to 5 µm and a major-axis average dimension of primary particles in the range from 0.5 µm to 20 µm and having a crystal structure of which plane (020) is grown, the second powder comprising second primary particles having a minor-axis average dimension in the range from 0.01 µm to 0.3 µm and a major-axis average dimension in the range from 0.5 µm to 1 µm;
wherein
an aspect ratio of the second primary particles is from 5/3 to 100/1, and
a content of the first powder of a monoclinic titanium dioxide compound and the second powder of a monoclinic titanium dioxide compound in the active material layer is from 70 to 98% by mass of the active material layer.

2. The electrode according to claim 1, wherein a proportion of a mass of the second powder to the sum of a mass of the first powder and the mass of the second powder is in the range from 25% to 75%.

3. The electrode according to claim 1, wherein a density of the active material layer is in the range from 1.8 g/cm$^3$ to 3.0 g/cm$^3$.

4. A nonaqueous electrolyte battery comprising:
the electrode according to claim 1 as a negative electrode;
a positive electrode; and
a nonaqueous electrolyte.

5. A battery pack comprising:
the nonaqueous electrolyte battery according to claim 4; and
a container accommodating the battery.

6. The electrode according to claim 1, wherein the monoclinic titanium dioxide compound belongs to a space group C2/m.

7. The electrode according to claim 1, wherein the monoclinic titanium dioxide compound is represented by the formula of Li$_x$TiO$_2$, wherein $0 \leq x \leq 1$.

8. The electrode according to claim 1, wherein an aspect ratio of the first primary particles is from 1/1 to 10/1, and the aspect ratio of the secondary primary particles is from 5/3 to 10/1.

9. The electrode according to claim 1, wherein a BET specific surface area of the titanium dioxide compound is in a range from 5 m$^2$/g to 100 m$^2$/g.

10. The electrode according to claim 1, wherein the active material layer further comprises at least one compound selected from the group consisting of titanium dioxide having an anatase structure (TiO$_2$), lithium titanate having a ramsdellite structure (Li$_2$Ti$_3$O$_7$), and lithium titanate having a spinel structure (Li$_4$Ti$_5$O$_{12}$).

11. The electrode according to claim 1, wherein the first powder is a plate-like crystal.

12. An electrode for battery comprising:
a current collector; and
an active material layer provided on the current collector, the active material layer comprising a first powder consisting of a monoclinic titanium dioxide compound and a second powder consisting of a monoclinic titanium dioxide compound,
wherein
the first powder comprises first primary particles, and the second powder comprises second primary particles,
a minor-axis average dimension of the first primary particles is from 0.5 μm to 5 μm,
a major-axis average dimension of the first primary particles is from 0.5 μm to 20 μm,
a minor-axis average dimension of the second primary particles is from 0.01 μm to 0.3 μm;
a major-axis average dimension of the second primary particles is from 0.5 μm to 1 μm; and
the second primary particles have an aspect ratio of from 5/3 to 100/1;
wherein a content of the first powder of a monoclinic titanium dioxide compound and the second powder of a monoclinic titanium dioxide compound in the active material layer is from 70 to 98% by mass of the active material layer.

13. The electrode according to claim 12, wherein a proportion of a mass of the second powder to the sum of a mass of the first powder and the mass of the second powder is in the range from 25% to 75%.

14. The electrode according to claim 12, wherein a density of the active material layer is in the range from 1.8 g/cm$^3$ to 3.0 g/cm$^3$.

15. The electrode according to claim 12, wherein the monoclinic titanium dioxide compound belongs to a space group C2/m.

16. A nonaqueous electrolyte battery comprising:
the electrode according to claim 12 as a negative electrode;
a positive electrode; and
a nonaqueous electrolyte.

17. A battery pack comprising:
the nonaqueous electrolyte battery according to claim 16; and
a container accommodating the battery.

18. The electrode according to claim 1, wherein a proportion of a mass of the second powder to the sum of a mass of the first powder and the mass of the second powder is in the range from 50% to 75%.

19. The electrode according to claim 12, wherein a proportion of a mass of the second powder to the sum of a mass of the first powder and the mass of the second powder is in the range from 50% to 75%.

\* \* \* \* \*